March 3, 1970   D. A. KATKO   3,498,190
HYDRAULIC CYLINDER
Filed June 7, 1967
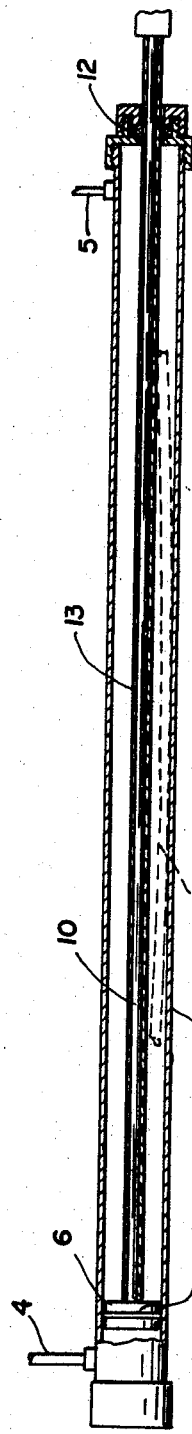
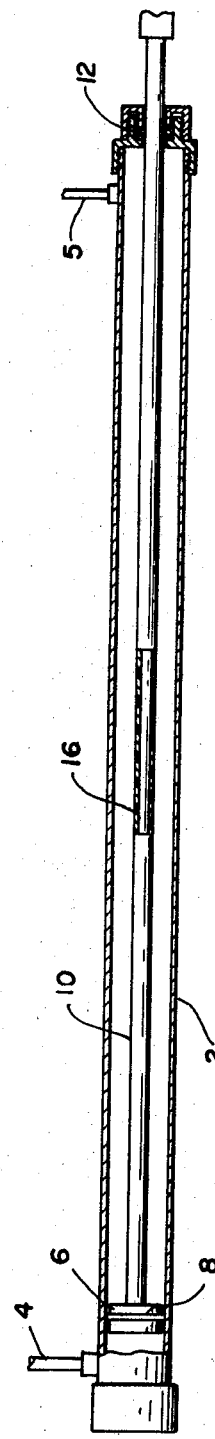
INVENTOR.
DANIEL A. KATKO
BY
his ATTORNEY

United States Patent Office 3,498,190
Patented Mar. 3, 1970

3,498,190
HYDRAULIC CYLINDER
Daniel A. Katko, Hubbard, Ohio, assignor to Lombard Corporation, Youngstown, Ohio, a corporation of Ohio
Filed June 7, 1967, Ser. No. 644,229
Int. Cl. F01b 31/10
U.S. Cl. 92—155    2 Claims

ABSTRACT OF THE DISCLOSURE

In the manufacture of hydraulic cylinders, especially ones having a piston rod having an L/R ratio of 120 or more, favorable results as respects avoidance of galling are obtained, although in use the piston is substantially flexed and forced against the walls of the hydraulic cylinder, by shrink-fit sleeving at least a recess-containing central portion of the piston rod in a suitably wear-resistant plastic, such as polytetrafluoroethylene.

BACKGROUND OF THE INVENTION

Field of the invention

The invention relates to hydraulic cylinders, and more particularly to hydraulic cylinders of relatively long stroke, such as ten feet to fifty feet, and slender piston rods as characterized by an L/R ratio of about 120 or greater.

Description of the prior art

It is known to protect metal roll from corrosion by providing a sleeve of plastic material. It is believed new, however, to afford a piston rod protection against corrosion caused by the mill atmosphere, and thereby lengthen the life of the rod packing, by sleeving the rod with plastic or another non-metallic, wear-resistant material. The problem of avoiding scoring or wear upon the interior barrel wall of the cylinder and upon the piston rod is one that has customarily been met by designing the rod to a slenderness ratio, L/R, substantially less than 120, so that the rod would have sufficient stiffness that such wear or abrasion does not occur. With the invention, rods that are more economical because of their slender porportions can be used.

SUMMARY OF THE INVENTION

In accordance with the present invention, the problem of short life of the rod packing, as a result of having the packing come into contact with a portion of the rod that has become worn, rough or pitted as a result of contact with the corrosive mill atmosphere, is overcome by providing a sleeve of non-metallic, wear-resistant material, preferably a resilient material such as polytetrafluoroethylene or a copolymer of hexamethylenetetramine and adipic acid, the sleeve being about 1/32 to 1/8 inch thick and covering substantially the entire length of the piston rod. There is, moreover, the problems that with a long-stroke cylinder, such as one having a stroke of ten feet to fifty feet, it is sometimes desirable from the standpoint of economy of material to use a slender rod, such as one having an L/R ratio of 120 or greater, but this practice has the associated drawback that the central portion of such a long and slender rod tends to become deflected against the interior barrel wall of the cylinder, causing roughness and wear on the abovementioned wall, on the rod, or both. This may happen as a result of the weight of the rod or as a result of forces applied to the rod, or combination of these factors. In accordance with the invention, the problem of having the life of the piston packing shortened by contact with such a rough portion of the interior barrel wall of the cylinder and the problem of having the piston-rod packing life shortened as a result of contact with the roughened portion of the piston rod are overcome by enclosing at least the central portion of the piston rod in a sleeve of non-metallic, wear-resistant material, preferably a resilient material such as polytetrafluoroethylene or a copolymer of hexamethylenetetramine and adipic acid.

BRIEF DESCRIPTION OF THE DRAWINGS

A complete understanding of the invention may be had from the foregoing and following description, taken together with the drawings, in which:

FIGURE 1 is an elevation view, partly broken away and in section, showing one embodiment of my invention; and FIG. 2 is an eelvation view, partly broken away and in section, showing another embodiment of my invention.

DESCRIPTION OF THE PREFERRED EMBODIMENTS

FIG. 1 shows a hydraulic cylinder 2, which may be fed with hydraulic fluid through line 4 from a convenient source or reservoir (not shown), to which fluid is returned through a line 5. Contained within the cylinder is a piston 6 having packing 8 and its associated piston rod 10. Packing 12 is provided at the point where the piston rod 8 leaves the cylinder 2. In accordance with the invention, there is provided about the piston rod 8 for substantially its entire length a coating or sleeve 13 of non-metallic, wear-resistant material. A resilient plastic-like material such as polytetrafluoroethylene or a copolymer of hexamethylenetetramine and adipic acid is preferred, but it will be apparent to those skilled in the art that other similar materials might be used. A coating or sleeve of about 1/32 to 1/8 inch in thickness is used. The coating must be sufficiently thick to have substantial durability, and the use of coatings greater than about 1/8 inch in thickness is without added economic benefit justifying the increased cost. Thus, when forces are applied to the rod and the rod bends against the top or sides or bottom of the barrel wall, as indicated at 14, the above-indicated disadvantages are avoided.

It will be understood that with rods having a slenderness ratio L/R of about 120 or greater, and particularly in long-stroke cylinders having a stroke of ten feet to about fifty feet, the piston rod may, from time to time, be deflected against the interior barrel wall of the cylinder, as indicated by the dotted lines at 14, and for the purpose of overcoming problems caused by scoring of the interior barrel wall or the piston rod, the central portion of the piston rod is provided with the coating or sleeve mentioned above.

FIG. 2 shows an alternative embodiment of the invention, according to which only the central portion of the rod is provided with the coating or sleeve. This would be done, for example, when corrosion of the piston rod as a result of contact with the mill atmosphere is not a problem. When this is done, there is machined into the rod a suitable recess 16, having a depth corresponding to the thickness of the sleeve to be used and a length of at least about 1/50 that of the piston rod. In certain circumstances, the sleeve may be made substantially longer up to about 1/2 the length of the rod, as when the slenderness ratio is quite high and the interior diameter of the cylinder is small. The sleeve is subseqently shrink-fitted into the recess 16 thus provided.

While I have shown and described above certain embodiments of my invention, I intend to cover as well any changes or modifications therein which may be made without departing from the spirit nad scope of the invention.

I claim as my invention:

1. A hydraulic cylinder arrangement comprising a cylinder, a piston in said cylinder, a piston rod connected to said piston and having a slenderness ratio $L/R$ of about 120 or greater, a packing between said piston and the interior wall of said cylinder, and means for supplying fluid under pressure to said cylinder to bear against said piston, characterized in that there is provided in a central portion of said piston rod a recess extending at least $\frac{1}{50}$ of the length of said piston rod and a sleeve of non-metallic, wear-resistant material shrink-fit within said recess.

2. An arrangement as defined in claim 1, characterized in that said wear-resistant material is selected from the group consisting of polytetrafluoroethylene and a copolymer of hexamethylenetetramine and adipic acid.

References Cited

UNITED STATES PATENTS

| | | | |
|---|---|---|---|
| 587,360 | 8/1897 | Carroll | 308—4 X |
| 1,918,426 | 7/1933 | Radnor | 92—52 X |
| 2,846,943 | 8/1958 | Belk | 92—249 X |
| 2,888,879 | 6/1959 | Gaarder | 92—155 X |
| 3,263,520 | 8/7966 | Tschanz | 74—501 |
| 3,398,652 | 8/1968 | Miller | 92—165 |

CARROLL B. DORITY, Jr., Primary Examiner